United States Patent [19]

Suetehall

[11] Patent Number: 5,738,338
[45] Date of Patent: Apr. 14, 1998

[54] INSTALLING AN OPTICAL FIBRE LINE IN A DUCT

[75] Inventor: Ralph Sutehall, Gwent, Wales

[73] Assignee: Pirelli General plc, England

[21] Appl. No.: 729,871

[22] Filed: Oct. 15, 1996

[30] Foreign Application Priority Data

Oct. 24, 1995 [GB] United Kingdom ............ 9521776

[51] Int. Cl.$^6$ .................................................. B65H 59/00
[52] U.S. Cl. .................................................. 254/134.4
[58] Field of Search ...................... 254/134.3 R, 134.4, 254/134.3 FT

[56] References Cited

U.S. PATENT DOCUMENTS 5,645,267  7/1997  Reeve et al. ...................... 254/134.4

FOREIGN PATENT DOCUMENTS

| 108590A1 | 5/1984 | European Pat. Off. . |
| 345968 | 12/1989 | European Pat. Off. . |
| 521710A1 | 1/1993 | European Pat. Off. . |
| 620627A1 | 10/1994 | European Pat. Off. . |
| 4112185A1 | 10/1992 | Germany . |
| 2282897 | 4/1995 | United Kingdom . |

OTHER PUBLICATIONS

Patent Abstracts of Japan—vol. 009, No. 148 (P-366), 22 Jun. 1985.

*Primary Examiner*—Robert C. Watson
*Attorney, Agent, or Firm*—Brooks Haidt Haffner & Delahunty

[57] ABSTRACT

The moisture content of compressed air being supplied by a compressor 24 to propel an optical fibre line 18 along a duct is monitored by a dew point meter 22 and adjusted such that it is maintained within a predetermined range. The adjustment is carried out by passing the compressed air through two passages 30, 32 arranged in parallel with one passage 30 being provided with means 20 for increasing the moisture content of the air passing therethrough and adjusting the relative flow rates through the two passages.

16 Claims, 2 Drawing Sheets

INSTALLING AN OPTICAL FIBRE LINE IN A DUCT

This invention relates to installing an optical fibre line in a duct, and more particularly to installing an optical fibre line in a duct by propelling the line therealong by gas flow.

Such a technique, which can be referred to as 'blown installation' is known and disclosed for example in EP-A-0108590. In this technique an optical fibre line, which comprises at least one optical fibre, has an outer surface over which the gas flows during installation. The materials forming the outer surface of the line and the inner surface of the duct are typically such that static electricity is generated by friction between these surfaces and has an adverse effect on the length of line which can be installed in the duct for a given gas flow rate.

The present invention is based on the realisation that the generation of such static electricity can be reduced or eliminated by increasing the moisture content of the gas being used to propel the line along the duct. However, it is also recognised that too high a moisture content adversely effects the length of line which can be installed for a given gas flow rate by increasing the frictional resistance due to moisture. Accordingly, an object of the invention is to enable the moisture content of the gas being used to be controlled.

The invention includes a method of installing an optical fibre line in a duct comprising propelling the line along the duct by gas flow, adding moisture to said gas upstream of said duct, monitoring the moisture content of said gas entering said duct, and adjusting said moisture content such that it is within a predetermined range.

The invention also includes an installation comprising a duct having an optical fibre line extending therealong which has been installed by a method as defined in the last preceding paragraph.

The moisture may be added by bubbling said gas through water.

The gas flow may be provided by mixing at least two flows of gas with different moisture contents, moisture having been added to at least one of said flows prior to said flows being mixed. In this case, the moisture content of said gas entering said duct may be adjusted by adjusting the relative flow rates of said at least two flows of gas which are mixed.

Optionally, at least one of the flows of gas which are mixed has its moisture content reduced prior to mixing with said at least one flow to which moisture has been added.

Preferably, the moisture content of said gas entering said duct is such that the dew point thereof is greater than about $-15°$ C. and less than about $-10°$ C.

Typically, the gas will be air.

The invention also includes apparatus for installing an optical fibre line in a duct, comprising means for providing a gas flow into the duct for propelling the line along the duct, said gas flow providing means having an outlet means connectable to said duct and including means for adding moisture to the gas upstream of said outlet means, means for monitoring the moisture content of the gas being supplied to said outlet means, and means for adjusting said moisture content.

The means for adding moisture may comprise a container for water, a heater for heating water contained in said container, and means for passing gas through water contained in said container.

The gas flow providing means may comprise at least two gas flow passages which interconnect upstream of said outlet means, at least one of said flow passages being provided with a said means for adding moisture. In this case, the means for adjusting said moisture content may comprise valve means for adjusting the relative flow rates of gas in said flow paths.

At least one of the flow passages may be provided with means for reducing the moisture content of gas flowing therein.

The gas flow providing means may comprise means for supplying an optical fibre line into said duct together with said gas flow and the monitoring means may be downstream or upstream of said optical line supply means.

In order that the invention may be well understood, an embodiment thereof, which is given by way of example only, will now be described with reference to the accompanying drawings, in which.

Figure 1:
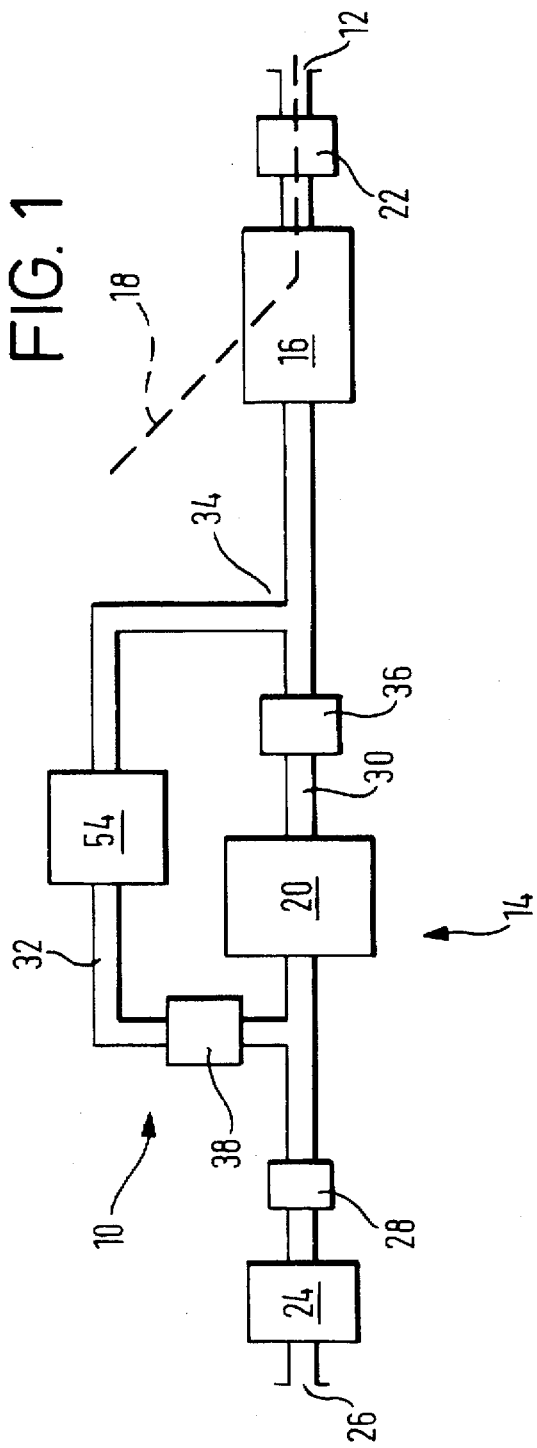
FIG. 1 is a schematic illustration of an apparatus for installing an optical fibre line in a duct.

Referring now to FIG. 1, the illustrated apparatus 10 has an outlet 12 connectable to a duct (not shown) into which an optical fibre line is to be installed. The apparatus generally comprises means 12 for providing a gas flow into the duct for propelling the line along the duct which means includes a means 16 for supplying an optical fibre line, shown in dotted line at 18, into the duct with the gas flow. This means 16 is sometimes referred to as a blowing head. Since details of the blowing head do not form part of the invention a detailed description thereof is omitted for the sake of brevity. However, reference is directed to EP-A-0108590 for details of an example of a suitable blowing head.

The optical fibre line itself comprises at least one optical fibre and may include electrical conductors. The above-mentioned EP-A-0108590 discloses such optical fibre lines as do EP-A-0345968, EP-A-0521710 and GB-A-2282897.

The gas flow providing means 14 also includes means 20 for adding moisture to the gas upstream of the outlet 12 and means 22 for monitoring the moisture content of the gas being supplied to the outlet 12. The monitoring means 22, which comprises a dew point meter in the embodiment is downstream of the line supplying means 16 but may alternatively be provided upstream thereof.

In more detail, the illustrated apparatus provides a flow of compressed air and comprises an air compressor 24 which compresses air received from an intake 26 thereof and feeds compressed air via a pressure regulator and air filter device 28 to two flow passages 30 and 32 which interconnect at 34 upstream of the outlet 12. The relative flow rates of compressed air in the passages 30 and 32 is adjustable by valve means shown as a separate flow regulating valve 36 and 38 in each of the flow passages 30, 32. A flow meter is associated with each valve in the embodiment to provide an indication of the flow rate therethrough.

Figure 2:
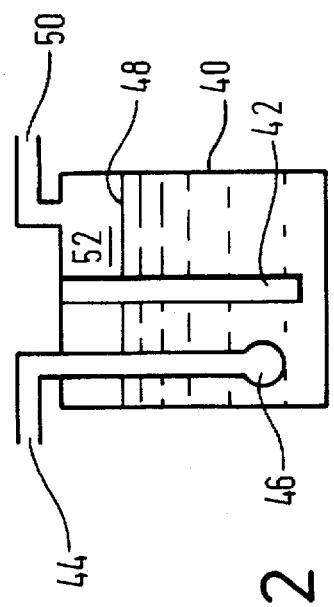
FIG. 2 is a schematic, but more detailed, illustration of part of the apparatus of FIG. 1.

The means 20 for adding moisture to the gas upstream of the outlet 12, as shown in FIG. 2, comprises a container, or tank 40. The container is part-filled with water which is heated to about $50°$ C. by a heater 42 disposed in the container. An inlet 44 is provided for directing compressed air in flow passage 30 into the container and is provided with an exit 46 which in use is situated beneath the water level 48 and provided with a so-called 'bubbler' whereby compressed air is bubbled into the water. The container has an outlet 50 which connects the space 52 above the water level with the flow passage 30 downstream of the container.

The flow passage 32 is provided with means 54 for reducing the moisture content therein. In the embodiment this means comprises a semi-permeable membrane but it may take the form of any other device for drying air, for example it may be a device which includes a dessicant.

In operation, the moisture content of the compressed air entering the duct, to which the outlet 12 of the apparatus is connected, is monitored using the dew point meter 22. The moisture content of the compressed air entering the duct can be adjusted by adjusting the relative flow rates of the flows of compressed air through the passages 30 and 32 using valves 36 and 38.

Figure 3:
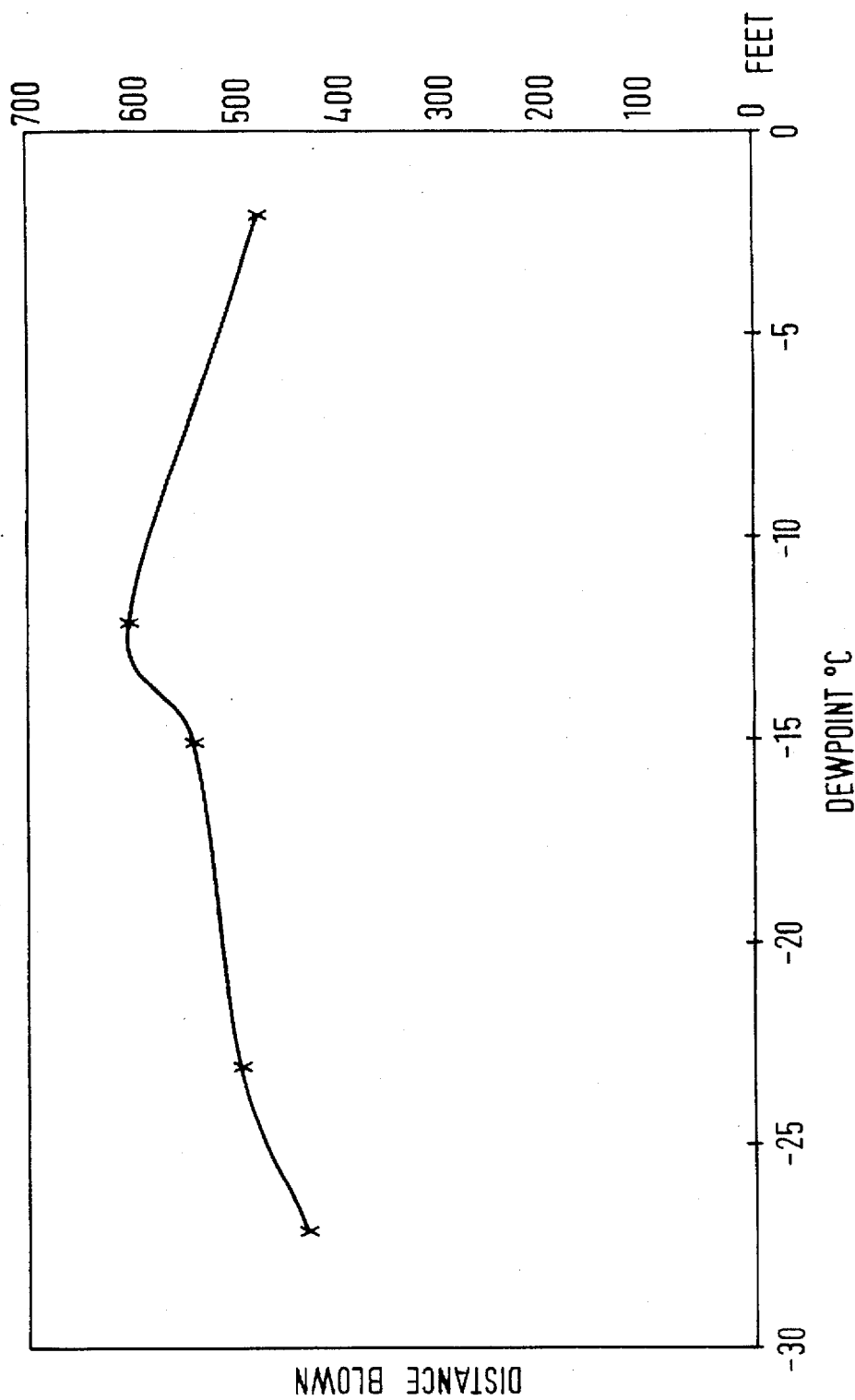
FIG. 3 is a graph showing the effect of moisture content of a gas being used to propel an optical line along a duct on the length of line which is installed for a given gas flow rate using apparatus as shown in FIG. 1.

Referring to FIG. 3, there is shown the results of some tests carried out to ascertain the effect on moisture content on the length of line which can be installed for a given air flow rate. The air flow rate for the tests was such that at the outlet 12 the flow rate was about 30 liters/min at 10 bar. It will be noted that the maximum length of line which is installed for a given flow rate of compressed air occurs when the moisture content of the compressed air at the meter 16 is such that the due point is about −3° C. It will also be noted that both increasing the moisture content and decreasing the moisture content from this optimum amount reduces the length of line which is installed. However, good results are obtained by maintaining the moisture content such that the dew point is greater than about −15° C. and less than about −10° C.

It is to be understood that the relative flow rates through passages 30 and 32 would be adjustable if only one of those passages were provided with a flow regulating valve although the provision of such a valve in each passage facilities adjustment.

Also, it is to be understood that the means 54 for reducing moisture content in passage 32 may be omitted, since the main function of the apparatus is to increase the moisture content of the air supplied by the gas compressor 24. However, the provision of the means 54 facilitates accurate adjustment of the moisture content of the air at the meter 22 since it enables this to be achieved using substantial flows of air through both passages. For example typically more than 50% of the total flow will be through the passage 30 when the passage 32 is provided with the means 54 whereas if the air in passage 32 were not dried, only a small amount of flow of air through passage 30 would be required making accurate adjustment more difficult.

It is also to be to appreciated that whilst the illustrated apparatus divides the compressed air into two flows it is envisaged that the compressed air may be divided into more than two flows—for example three flows in respective passages, one of which is provided with a means for increasing moisture content, one of which is provided with a means for reducing moisture content and one of which is devoid of either of these means.

Furthermore, it is to be understood that the means for increasing moisture content may itself be provided with means for adjusting the amount of moisture it adds to the compressed air, or be mounted in series with an adjustable air drying means, in which case only one path for the compressed air between the compressor 24 and outlet 12 need be provided.

I claim:

1. A method of installing an optical fibre line in a duct comprising propelling the line along the duct by gas flow, adding moisture to said gas upstream of said duct, monitoring the moisture content of said gas entering said duct, and adjusting said moisture content such that it is within a predetermined range.

2. A method as claimed in claim 1, wherein moisture is added to said gas by bubbling said gas through water.

3. A method as claimed in claim 1, wherein said gas flow is provided by mixing at least two flows of gas with different moisture contents, moisture having been added to at least one of said flows prior to said flows being mixed.

4. A method as claimed in claim 3, wherein said moisture content of said gas entering said duct is adjusted by adjusting the relative flow rates of said at least two flows of gas which are mixed.

5. A method as claimed in claim 3, wherein at least one of the flows of gas which are mixed has its moisture content reduced prior to mixing with said at least one flow to which moisture has been added.

6. A method as claimed in claim 1, wherein the moisture content of said gas entering said duct is such that the dew point thereof is greater than about −15° C. and less than about −10° C.

7. A method as claimed in claim 1, wherein said gas is air.

8. Apparatus for installing an optical fibre line in a duct, comprising means for providing a gas flow into the duct for propelling the line along the duct, said gas flow providing means having an outlet means connectable to said duct and including means for adding moisture to the gas upstream of said outlet means, means for monitoring the moisture content of the gas being supplied to said outlet means, and means for adjusting said moisture content.

9. Apparatus as claimed in claim 8, wherein said means for adding moisture comprises a container for water, a heater for heating water contained in said container, and means for passing gas through water contained in said container.

10. Apparatus as claimed in claim 8, wherein said gas flow providing means comprises at least two gas flow passages which interconnect upstream of said outlet means, at least one of said flow passages being provided with a said means for adding moisture.

11. Apparatus as claimed in claim 10, wherein said means for adjusting said moisture content comprises valve means for adjusting the relative flow rates of gas in said flow paths.

12. Apparatus as claimed in claim 10, wherein at least one of the flow passages is provided with means for reducing the moisture content of gas flowing therein.

13. Apparatus as claimed in claim 8, wherein said monitoring means comprises a dew point meter.

14. Apparatus as claimed in claim 8, wherein said gas flow providing means includes means for supplying an optical fibre line into said duct together with said gas flow.

15. Apparatus as claimed in claim 14, wherein said monitoring means is downstream of said optical line supplying means.

16. Apparatus as claimed in claim 14, wherein said monitoring means is upstream of said optical line supplying means.

* * * * *